April 15, 1952 — L. CHAUVEAU — 2,593,266
APPARATUS FOR SELECTING SIGNALS OF A PARTICULAR FREQUENCY
Filed July 1, 1947 — 3 Sheets-Sheet 1
FIG. 1
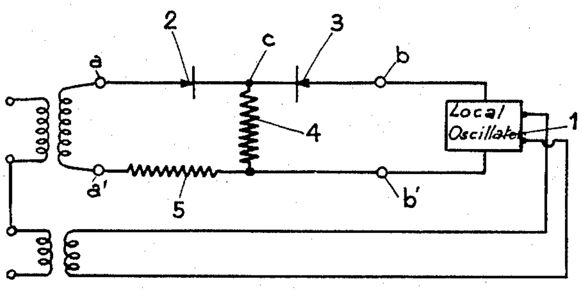
FIG. 2, FIG. 3, FIG. 4
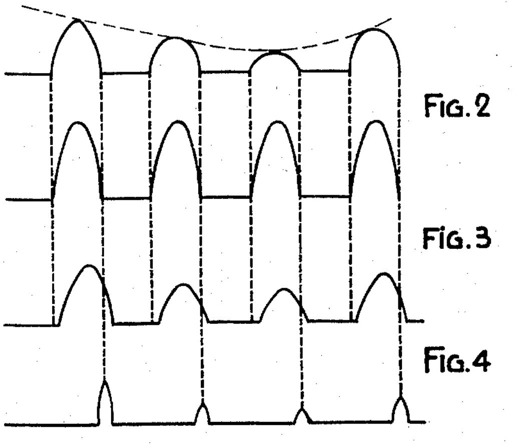
FIG. 5
FIG. 6
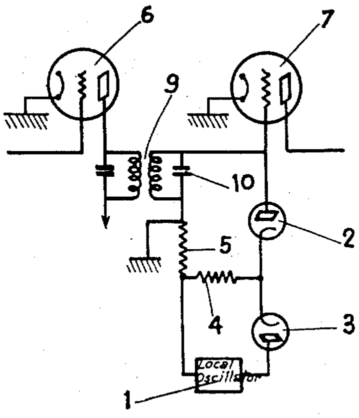
FIG. 7
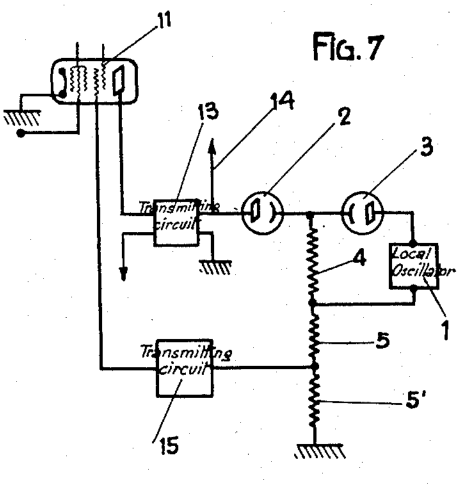
Inventor:
Louis Chauveau
By: Thomas W. West
Atty.

Inventor:
Louis Chauveau
By Thomas H. West,
Atty.

April 15, 1952 | L. CHAUVEAU | 2,593,266

APPARATUS FOR SELECTING SIGNALS OF A PARTICULAR FREQUENCY

Filed July 1, 1947 | 3 Sheets-Sheet 3

Inventor:
Louis Chauveau
By: Thomas W. Watts
Atty.

Patented Apr. 15, 1952 2,593,266

UNITED STATES PATENT OFFICE 2,593,266

APPARATUS FOR SELECTING SIGNALS OF A PARTICULAR FREQUENCY

Louis Chauveau, Paris, France

Application July 1, 1947, Serial No. 758,382
In France February 21, 1947

9 Claims. (Cl. 250—20)

The present invention relates to a device for selecting one or several frequencies the amplitudes of which may be variable or constant, by means of locally produced synchronous oscillations.

It is an object of the invention to combine the frequencies received with a local frequency which is synchronous with the frequency to be filtered so that a current or a voltage will be obtained which depends on the undesirable frequencies to be eliminated, the said current or voltage being used to weaken or to suppress these undesirable frequencies.

With this and other objects in view, the device according to the invention comprises in a high frequency amplifier, means for producing a local oscillation having the same frequency and phase as the signal to be selected and an amplitude greater than that of the latter, two rectifying elements supplied with the signal and the local oscillation respectively, a circuit in which both said rectifying elements are connected in opposition whereby the first rectifying element is blocked by the second so long as the oscillations supplied to said rectifiers respectively are identical with respect to their phases and frequencies and means for controlling the amplifier by the differential current flowing in said circuit during the time intervals corresponding to the suppressed alternations of the local oscillation and produced by the undesirable oscillations accompanying this signal.

Fig. 1 shows the principal diagram of a circuit for the working of the process according to the invention.

Figs. 2 to 5 illustrate the operation of the device shown on Fig. 1.

Figs. 6 to 10 show several embodiments of the device according to the invention and which are given by way of example.

Fig. 10 is a diagrammatic illustration of a circuit using the selecting device of the invention.

Figure 8:
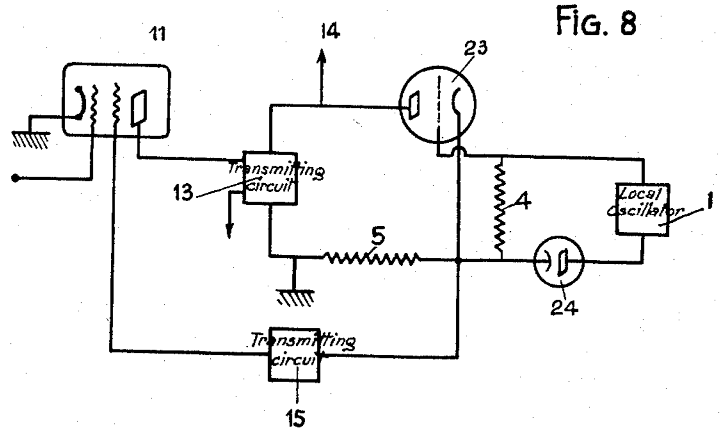

In the device shown on Fig. 1, the signal to be filtered and which consists of the frequency to be selected and eventually of parasitic frequencies, is applied across terminals *a*, *a'* while a local and synchronous oscillation produced in a local oscillator 1 synchronised by the signal is applied across terminals *b*, *b'*. Local oscillator 1 is adjusted so that the amplitude of the local oscillation will be always higher than that of the oscillation which must be selected. Two rectifiers 2, 3 are connected in opposition at one end of a common impedance 4, the other end being connected on one hand directly to terminal *b'* and on the other hand to terminal *a'* through another impedance 5. Under these conditions when the signal received consists solely of the oscillation to be selected, the two voltages supplied at point *c* from the output of the two rectifiers are in phase and of the same shape, as shown on Figs. 2 and 3. The voltage supplied by rectifier 3 (Fig. 3) being higher than that supplied by rectifier 2 (Fig. 2), the latter rectifier is blocked so that there is no current flowing in circuit *a*—2—*c*—4—5—*a'* through resistance 5. But on the contrary when the oscillation to be selected is accompanied by parasitic oscillations with unlike frequencies and phases, the curve of the rectified voltage supplied by rectifier 2 is shifted, as shown for instance on Fig. 4, these voltage alternations extending over the time intervals for which the voltage of rectifier 3 is lower or equal to zero, so that a certain periodical current such as that shown on Fig. 5 will flow through resistance 5 and may be used for weakening the amplification of the parasitic oscillations upon which its value is depending.

By way of example a few practical embodiments of such a selective device are described below.

In the example shown on Fig. 6, the receiver comprises two preamplifying tubes 6, 7 the first of which receives the ensemble of the useful and undesirable oscillations constituting the signal. The plate of this first preamplifying tube is connected to the grid of tube 7 through a tuned circuit or through a resonance transformer 9 whose secondary is shunted by a condenser 10. A circuit of the type shown on Fig. 1 and comprising two rectifying tubes 2, 3 in opposition, a common impedance 4, and a resistance 5 in the circuit of tube 2, is connected on one side across the terminals of condenser 10, and on the other side across the terminals of an oscillator 1 supplying a local synchronous oscillation in phase with the oscillation to be selected. The end of resistance 5 which is connected to one of the condenser terminals is grounded. Under these conditions when the oscillation to be selected is accompanied by parasitic oscillations, the reception of those parasites results in a current flowing through resistance 5, as shown in Figs. 3 to 5, so that owing to the consequent loss of energy, the connecting transformer 9 is damped and the parasitic oscillations are preamplified to a substantially lesser degree than the signal to be selected, for during the reception of the alternations of this signal there is no current flowing through resistance 5. The required damping will be considerably increased by substituting resistance 5, a device having a negative internal resistance.

According to the embodiment shown on Fig. 7, the current which parasites cause to flow in resistance 5 is used for controlling the amplification of one stage of the receiver. To this end, the receiver comprises a preamplifying tube 11, for instance a two-grid tube, the first grid receiving the signal and the plate being connected to the previously described circuit 1—2—3—4—5 through a transmitting unit 13 composed of the usual circuits: inductances, resistances, condensers, and a filter, the signal being directed through tap 14 towards the following stages of the receiver. Resistance 5 is connected through an appropriate transmitting unit 15 such as filters, amplifier or oscillating circuit, to the second grid of tube 11 so that the voltage thus applied to this grid opposes the amplification of the parasitic oscillations which cause this voltage to arise in the selecting circuit. It is also possible to combine these means with those described in connection with Fig. 6 in which the connecting circuits are damped while parasites are passing through. To this end a second resistance 5′ which is grounded is connected in series with resistance 5, the latter resistance being negative. Naturally, instead of consisting of an ohmic resistance 5′, the element carrying the current which is only a function of the oscillations to be eliminated may consist of any appropriate impedance. In the same manner the two-grid tube may be replaced by an electronic tube of an improved design comprising several electrodes. Finally the voltages obtained across resistance 5′ may be applied as well to the cathodes or plates of the previously mentioned tubes, the whole arrangement depending on the direction of currents and the effect which one is wishing to obtain.

According to the embodiment shown in Fig. 8, the rectifying elements of the selecting circuit comprise a triode 23 to which the signal is applied and a diode 24 supplied with the local synchronous oscillation supplied by oscillator 1. The signal and the undesirable disturbing oscillations which are preamplified by the tube 11 are applied by means of the transmitting unit 13 to the plate of the triode 23, the grid of which is supplied with the negative alternations of the local oscillation rectified by the diode 24 and which is thus in phase opposition with the oscillation applied to the plate of said triode. Due to these connections, the triode 23 is blocked during the time interval corresponding to the reception of the signal, whereas a current is allowed to flow in resistances 4, 5 only during the time intervals corresponding to the suppressed positive alternations of the local oscillation. Said current which is dependent on undesirable frequencies is fed through transmitting unit 15 to a control-grid of preamplifier 11 in order to decrease the amplification again.

Of course the connections for Figs. 6, 7 and 8 may also be made symmetrically so that the action of the process can be effective on each alternation.

Figure 9:
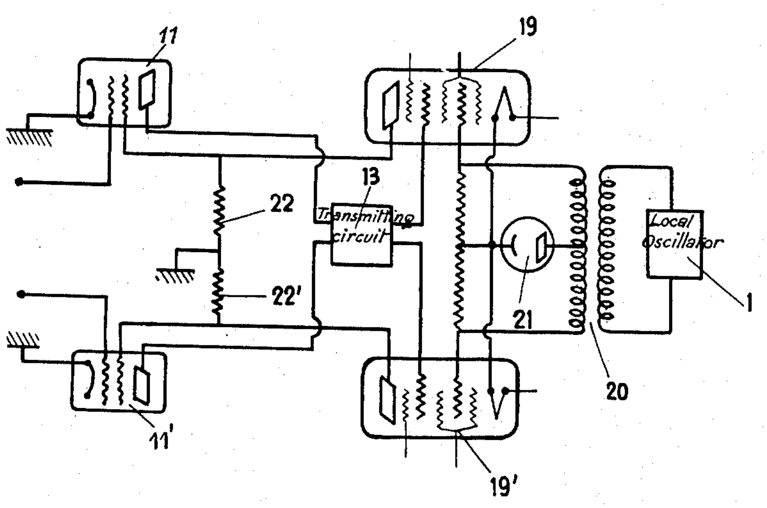

In the alternative shown on Fig. 9, the selecting circuit comprises a tube 19 with several electrodes, or two tubes 19, 19′ when using push-pull connections as shown. The first grid of each of these tubes receives the ensemble of the signal while the second grids receive the negative alternations of the local oscillation in phase opposition with the plate through a tube 21 supplied by transformer 20 connected to apparatus 1 which produces the local synchronous oscillation. The voltages produced across the anode resistances 22, 22′ are used in one of the aforesaid manner to eliminate undesirable oscillations.

Naturally the selecting devices described above can be used in succession in several stages of a receiver and this will permit to obtain a closer and closer filtration for the frequency to be selected.

Some of the most interesting applications of the invention are described below:

At the present time, there is a large number of means available to separate a carrier frequency from a modulated radio wave. This carrier wave will be used for the local frequency. It will be applied at the desired voltage and phase across $b, b'$ (Fig. 1) and the complete modulated wave across $a, a'$. As long as the frequency of the said modulated wave consists only of the carrier frequency with the symmetrical frequencies on each side of the said carrier frequency, no current will flow through resistance 5. When a parasitic frequency interferes with one of these bands, its symmetrical cannot evidently exist in the other band. Modulated alternations will then be shifted and corrected by the system as stated above.

Figure 10:
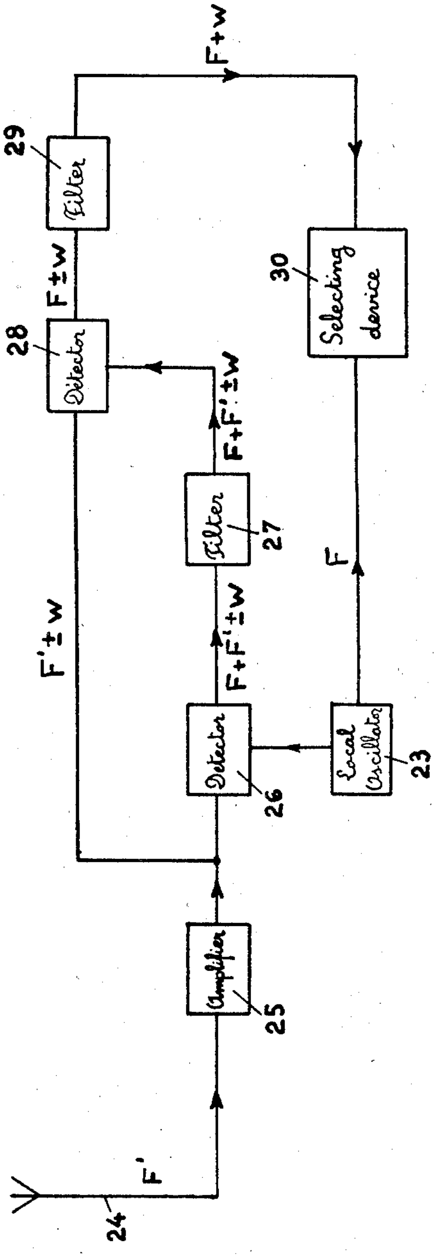

When a second wave having strictly the same modulation is available, it will be possible to complete the results thus obtained. Each of the two waves will be converted into another modulated wave having the same period by the following means: Let F be the new frequency produced by a local oscillator 23 (Fig. 10) and which one wishes to transfer to these two waves and let F′ be the carrier frequency of one of the waves to be filtered which are received by the aerial 24, after amplification in amplifier 25. Carrier F′ is modulated with F (or conversely) in detector 26 one of the frequencies $F'+F$ or $F'-F$ thus obtained is filtered in filter 27. One of those frequencies $F'+F$ for instance is again applied to the complete modulated wave $$F',\ F'+w,\ F'-w$$

in detector 28, thus producing a modulation resulting in frequencies, $$F'+F-(F',\ F'+w,\ F'-w)=F,\ F-w,\ F+w$$

i. e. the modulation one is wishing to obtain of the desired frequency.

After repeating the same process upon the other wave, the upper band on one of these transformed waves and the lower band of the other wave are filtered, the two bands being mixed so as to form a new modulated wave with a carrier frequency F, the said new wave being subjected to the action of the selecting device 30 according to the invention and as shown in the examples illustrated by Figs. 6 to 10.

The example which has been just given may be applied to any radio wave even to such waves which are worked on as pure sustained waves or which are intermittent signal waves. In such cases it will be possible to destroy the undesirable effects due to the figure of merit Q when a sharp filtration of these waves is required. In the same manner for modulated waves a close filtration is absolutely necessary only for the carrier wave, this being no more an inconvenience.

The invention may also be applied to the selection of one or several high or low frequencies by means of other equal frequencies.

Assuming the frequencies to be filtered are contained in A and the corresponding frequencies are contained in B. By means of A and B another local but much higher frequency is modulated separately. One thus obtains two groups of modulated frequencies, *F*, *F*+*A*, *F*—*A*, and *F*, *F*+*B*, *F*—*B*. The upper band of one of these waves, *F*+*A* for instance, and the lower band of the other *F*—*B*, are filtered. Then the two latter bands are mixed in order to obtain another modulated frequency with a carrier frequency F, its shape being *F*, *F*+*A*, *F*—*B*, and which will be subjected to the effect of circuits according to Figs. 6 to 10. From the explanations given above the frequencies of A which will have no symmetrical frequencies in B, and vice-versa, will be eliminated, and the resulting modulated wave will contain only the desirable frequencies which it will be sufficient to detect and to subject to a filtration which will be easier than before.

Thus by way of example, when two radio waves issued from the same station but received upon different antennas are available, or when two different waves which are identically modulated are available, it is possible to detect them and to subject them to the process which has just been indicated.

This improvement can also be applied to harmonics for telegraphy and it permits a better filtration together with an improvement of the figure of merit Q for the circuits which are used as it will be always possible to obtain all the required local frequencies by means of alternators or synchronous oscillators.

What I claim is:

1. Device for selecting in an amplifier an oscillation having a given frequency and which is accompanied by other oscillations with undesirable frequencies comprising a connecting device which is tuned and connected between two successive stages of the amplifier, means for producing a local frequency which is synchronous and in phase with the frequency to be selected, the amplitude of the said local frequency being higher than that of the latter frequency, a rectifier across which the said local frequency is applied, a second rectifier connected to the aforesaid tuned connecting device, the ensemble of the oscillations received being applied across the said second rectifier, a first impedance common to the circuits of the said two rectifiers which are connected in opposition to one extremity of the said first impedance, a second impedance in the circuit of the second rectifier and connected on one hand to the second extremity of the said first impedance and on the other hand to the tuned connecting device so that the latter device be damped when said second impedance carries a current generated by oscillations whose frequencies are undesirable.

2. Device for selecting an oscillation having a given frequency accompanied by other oscillations with undesirable frequencies comprising an amplifier tube, means for applying on the grid of the said tube the ensemble of the oscillations received, means for producing a local oscillation which is synchronous and in phase with the oscillation to be selected, the amplitude of the said local frequency being higher than that of the latter frequency, a rectifier across which the said local frequency is applied, a second rectifier to which the plate of the amplifier tube is connected, a first impedance common to the circuits of the said first impedance which are connected in opposition to one extremity of the said first impedance, a second impedance connected on one hand to the second extremity of the said first impedance and on the other hand to the grid of the amplifier tube, a device inserted between the said second impedance and the grid of the said amplifier tube in order to apply to the said grid the current produced in the said second impedance and which opposes the undesirable oscillations.

3. Device according to claim 2 in which the second impedance consists of a resistance the mid point of which is connected to the grid of the amplifier tube, and whose second extremity is grounded, the first part of the said resistance being negative and the second part being positive.

4. Device for selecting in an amplifier an oscillation having a given frequency and which is accompanied by other oscillations with undesirable frequencies comprising means for producing a local frequency which is synchronous and in phase with the frequency to be selected, a tube with several electrodes on the plate of which the ensemble of oscillations received is applied, means for rectifying the local oscillation and applying on the grid of the said tube the negative alternations of the said local oscillation in phase opposition to the oscillation to be selected and which is applied to the plate of the tube, an impedance connected in the output circuit of the said tube and means for controlling the amplifier by the current produced in the said impedance.

5. Device according to claim 4 comprising two tubes with several electrodes with push-pull connections.

6. Device for selecting in an amplifier an oscillation having a given frequency and which is accompanied by other oscillations with undesirable frequencies comprising means for producing a local frequency which is synchronous and in phase with the frequency to be selected, a two-grid tube, means for applying to one of the grids of this tube the ensemble of the oscillations received, means for rectifying the local oscillation and means for applying to the second grid of the aforesaid tube the negative alternations of the said local oscillation in phase opposition to the oscillation to be selected and which is applied to the first grid, a resistance connected in the output circuit of the said tube and means for controlling the amplifier by the current produced in the said resistance.

7. Device according to claim 6 comprising two tubes with several electrodes with push-pull connections.

8. In a high frequency amplifier, a device for selecting a high frequency signal from undesirable oscillations accompanying said signal, comprising means for producing a local oscillation having the same frequency and phase as the signal to be selected and an amplitude greater than that of the latter, two rectifying elements supplied with the signal and the local oscillation respectively, a circuit in which both said rectifying elements are connected in opposition whereby the first rectifying element is blocked by the second so long as the oscillations supplied to said rectifiers respectively are identical with respect to their phases and frequencies, and means for controlling the amplifier by the differential current flowing in said circuit during the time intervals corresponding to the suppressed alternations of the local oscillation and produced by the undesirable oscillations accompanying the signal.

9. In a high frequency amplifier, a device for selecting a high frequency signal from undesirable oscillations accompanying said signal, comprising means for producing a local oscillation having the same frequency and phase as the signal to be selected and an amplitude greater than that of the latter, two rectifying elements supplied with the signal and the local oscillation respectively, a circuit in which both said rectifying elements are connected in opposition, said circuit comprising a parallel impedance one end of which is connected to the corresponding electrodes of both rectifying elements and a second impedance arranged in series in the circuit of the first rectifier, whereby the first rectifier is blocked by the second so long as the oscillations supplied thereto are identical with respect to their phases and frequencies, whereas a current produced by the undesirable frequencies is allowed to flow through the second impedance during the time interval corresponding to the suppressed alternations of the local oscillation, means for controlling the amplifier by said current.

LOUIS CHAUVEAU.

REFERENCES CITED

The following references are of record in the file of this patent:

UNITED STATES PATENTS

| Number | Name | Date |
|---|---|---|
| 2,056,031 | Wright | Sept. 29, 1936 |
| 2,194,292 | Bligh | Mar. 19, 1940 |
| 2,220,443 | Gabrilovitch | Nov. 5, 1940 |
| 2,240,500 | Gabrilovitch | May 6, 1941 |
| 2,295,207 | Gabrilovitch | Sept. 8, 1942 |
| 2,404,626 | Fyler | July 23, 1946 |